United States Patent
Torkington et al.

(10) Patent No.: US 6,198,907 B1
(45) Date of Patent: Mar. 6, 2001

(54) SATELLITE COMMUNICATIONS SYSTEMS USING SATELLITES IN A ZERO-DRIFT CONSTELLATION

(75) Inventors: Richard S. Torkington; Thomas P. Emmons, Jr., both of Mesa; Keith Warble, Chandler, all of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/016,976

(22) Filed: Feb. 2, 1998

(51) Int. Cl.⁷ ................................................... H04B 7/185
(52) U.S. Cl. .................... 455/12.1; 455/13.1; 455/428
(58) Field of Search ............................. 455/12.1, 13.1, 455/13.2, 427–429; 342/352, 357.16, 422, 428; 370/316, 323–324

(56) References Cited

U.S. PATENT DOCUMENTS

| | | | |
|---|---|---|---|
| 5,274,382 | * 12/1993 | Wills et al ............................. | 342/359 |
| 5,471,641 | * 11/1995 | Dosiere et al. ...................... | 455/13.1 |
| 5,483,664 | * 1/1996 | Moritz et al. ........................ | 455/13.1 |
| 5,559,806 | * 9/1996 | Kurby et al. ...................... | 455/428 X |
| 5,579,536 | * 11/1996 | Stackman et al. .............. | 455/13.2 X |
| 5,621,415 | 4/1997 | Tuck .................................... | 342/354 |
| 5,666,648 | * 9/1997 | Stuart .............................. | 455/13.1 X |
| 5,669,585 | 9/1997 | Castiel et al. ....................... | 244/158 |
| 5,765,098 | * 6/1998 | Bella ................................. | 455/13.3 |
| 5,890,679 | * 1/1999 | Chethik ........................... | 455/427 X |
| 5,894,590 | * 4/1999 | Vatt et al. .......................... | 455/12.1 |
| 5,926,758 | * 7/1999 | Grybos et al. ....................... | 455/429 |

* cited by examiner

Primary Examiner—William G. Trost
(74) Attorney, Agent, or Firm—James E. Klekotka

(57) ABSTRACT

A zero-drift constellation (200 FIG. 2) is used to simplify the tracking and hand-off requirements of terrestrial-based user terminals (110 FIG. 1). Each satellite (120 FIG. 1) traces out a common ground track which has a number of southbound segments and an equal number of adjacent northbound segments. This allows user terminals (110) to employ antennas with only one degree of freedom to track satellites (120) in zero-drift constellation (200). User terminals (110) perform hand-offs with satellites (120) that are within a limited field of view with respect to user terminal (110). User terminal (110) tracks a first satellite until a crossover point is reached and then performs a hand-off to a second satellite traveling in the opposite direction along an adjacent segment. User terminal (110) tracks the second satellite until another crossover point is reached and then performs a hand-off to a third satellite traveling in the same direction as the first satellite along an adjacent segment.

20 Claims, 8 Drawing Sheets

SATELLITE COMMUNICATIONS SYSTEMS USING SATELLITES IN A ZERO-DRIFT CONSTELLATION

FIELD OF THE INVENTION

This invention relates generally to satellite communications systems and, more particularly, to satellite communications systems which uses satellites in a zero-drift constellation.

BACKGROUND OF THE INVENTION

Low Earth Orbit (LEO) constellations have certain advantages over higher orbit constellations due to their closer proximity to the earth. For example, using the same optical aperture a LEO satellite can provide higher resolution images of the earth than a satellite in a Medium Earth Orbit (MEO) or a Geostationary (GEO) orbit. Equivalently, a LEO satellite can provide a communications link to a ground terminal using lower transmit power and/or a smaller antenna due to its range advantage over a MEO or GEO satellite. This proximity to earth also results in lower launch costs as well.

A LEO constellation also suffers some disadvantages due to its proximity to the earth. Each LEO satellite is in view of a smaller portion of the earth at any given instant, so a LEO constellation requires a larger number of satellites.

In addition, non-geostationary satellite planes precess or regress with respect to the global map, due substantially to the earth's rotation. This relative movement creates the need for ground based communications equipment to track non-geostationary satellites. The geometry of this tracking requires ground equipment that generally possesses two or more unrestrained physical degrees of steering freedom.

What is needed is a satellite constellation which allows low cost ground stations that employ relatively simple satellite tracking capabilities. Further, there is a need for a constellation which provides global coverage and which allows the use of low cost ground stations in most parts of the world. In addition, there is a need to maintain continuous contact with at least one satellite in a satellite constellation without requiring ground stations to have multiple antennas.

BRIEF DESCRIPTION OF THE DRAWINGS

A more complete understanding of the invention can be derived by referring to the detailed description and claims when considered in connection with the figures, wherein like reference numbers refer to similar items throughout the figures, and:

DETAILED DESCRIPTION OF A PREFERRED EMBODIMENT

Constellations have been proposed which use a variety of different orbital parameters. A "satellite" is defined herein to mean a man-made object or vehicle intended to orbit the earth, and the term can include both geostationary and non-geostationary satellites. A "constellation" is defined herein to mean an ensemble of satellites arranged in orbits for providing specified coverage of a portion or of all portions of the earth. A constellation typically includes multiple rings (or planes) of satellites, and it can have equal numbers of satellites in each plane, although this is not essential. A constellation could include geostationary or non-geostationary satellites, or a combination of both.

As is well known by those skilled in the art, orbital parameters are used to describe a satellite's orbit and a constellation's configuration. The inclination (i) is a constant defining the angle at which the orbital plane intersects the equator. In addition, the Right Ascension of the Ascending Node (RAAN) defines an angle between a non-rotating celestial reference and the line of nodes. The line of nodes is defined by a line formed using the intersection of an orbital plane and the plane of the equator. The line of nodes provides an orbit orientation.

Figure 1:
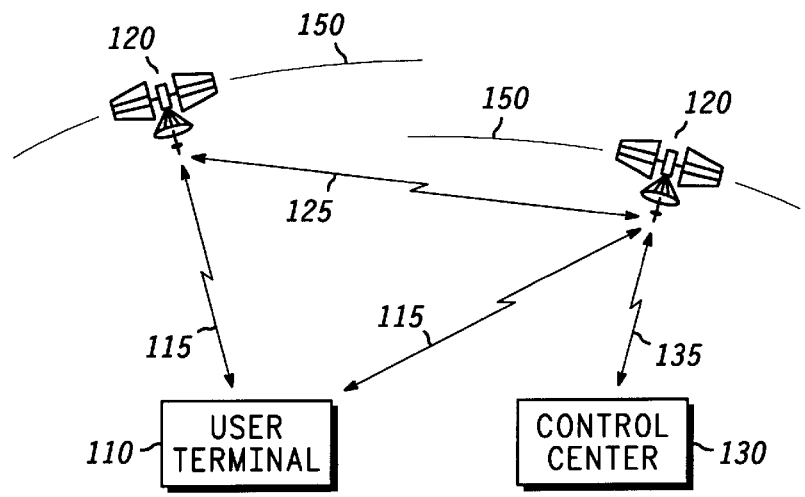
FIG. 1 shows a general view of a satellite communications system in accordance with a preferred embodiment of the invention.

FIG. 1 shows a general view of a satellite communications system in accordance with a preferred embodiment of the invention. Communications system 100 comprises at least one user terminal 110, a plurality of satellites 120, and at least one control center 130. Generally, communications system 100 can be viewed as a network of nodes. All nodes of communications system 100 are or can be in data communication with other nodes of communications system 100 through communication links (115, 125, and 135). In addition, all nodes of communications system 100 are or can be in data communication with other devices dispersed throughout the world through satellite or terrestrial networks and/or other conventional terrestrial devices coupled to communications system 100 through user terminals 110.

The invention is applicable to satellites that use single or multiple beams pointed towards the earth, and preferably, to satellites that move beams across the surface of the earth along a common ground track. The invention is also applicable to systems where full coverage of the earth is not achieved.

The invention is particularly applicable to satellite communications systems which use low cost user terminals with simple tracking capabilities. The invention provides satellites with synchronized orbits which allow user terminals located at fixed points to have fixed fields of view. Typically, these fields of view require only a single degree of steering freedom and can be defined by a one-dimensional angle such as elevation.

Constellations can be distinguished, for example, by the number of satellites and/or the altitude at which the satellites are positioned. In a zero-drift orbit, a satellite completes a specific number of revolutions in a particular amount of time. In this case, a satellite's altitude is determined by the number of revolutions it makes within a particular amount of time. For example, a satellite's altitude can be restricted to be below the first Van Allen radiation belt. In addition, a satellite's altitude can be determined by the size of a satellite's antenna footprint and the number of satellites in a constellation.

In a preferred embodiment of the invention, satellite communications system 100 comprises a plurality of LEO satellites in a zero-drift constellation. In this case, each satellite is in a resonant zero-drift circular orbit which repeats after a specific number of revolutions of the earth. This means that each satellite in the constellation traces out a substantially repeating ground track after this specific number of revolutions.

In a preferred embodiment, a satellite's position with respect to other satellites 120 within a zero-drift constellation is determined by phasing satellites 120 with respect to each other. In this case, satellite phasing is substantially equal, and this leads to satellites 120 having relatively even spacing within the zero-drift constellation. For example, the phasing between satellites 120 can be determined using a specific number of revolutions and the number of satellites being used in the zero-drift constellation.

In addition, each satellite 120 has an associated coverage area (not shown) within which satellite 120 is capable of communicating with user terminals 110 located on or near the surface of earth. Each satellite 120 has an associated zero-drift orbit 150 within which satellite 120 circles the earth.

Each satellite 120 communicates with other nearby satellites 120 through crosslinks 125. These crosslinks form a backbone in satellite communications system 100. Thus, data from one user terminal 110 located on or near the surface of the earth can be routed through a satellite or satellites in a zero-drift constellation to within range of substantially any other point on the surface of the earth. Crosslinks 125 provide a network for carrying services and control data anywhere on the earth or within a zero-drift constellation. Crosslinks 125 help to eliminate the need for a large infrastructure investment in ground stations or relay satellites.

User terminals 110 can be located at various points on the surface of earth or in the atmosphere above earth. Communications system 100 can accommodate any number of user terminals 110. User terminals 110 are preferably user terminals capable of transmitting and/or receiving data from satellites 120. By way of example, user terminals 110 can be located on individual buildings or homes. Moreover, user terminals 110 can comprise computers, video transmitters, or facsimile machines. In a preferred embodiment, user terminals 110 have been adapted to use at least one controllable antenna as described below.

In a preferred embodiment, user terminal 110 communicates with satellites 120 that are within a user terminal's field of view through links 115, which can be radio frequency (RF) and/or optical links. Link 115 can be established between any satellite 120 and user terminal 110 which are within communication range of each other. Typically, links are established within a limited field of view with respect to user terminal 110. This limited field of view allows the satellite tracking capabilities within user terminal 110 to be relatively simple and low cost.

In a preferred embodiment, control center 130 communicates with satellites 120 which are within its field of view through links 135, which can be RF and/or optical links. Link 135 can be established between any satellite 120 and control center 130 which are within communication range of each other. Typically, links are established within a limited field of view with respect to control center 130.

In a preferred embodiment, links 115, 125, and 135 encompass a limited portion of the electromagnetic spectrum that is divided into channels. Links 115, 125, and 135 can encompass any suitable channel diversity scheme such as Frequency Division Multiple Access (FDMA) and/or Time Division Multiple Access (TDMA) and/or Code Division Multiple Access (CDMA) communications channels or combinations thereof.

Figure 2:
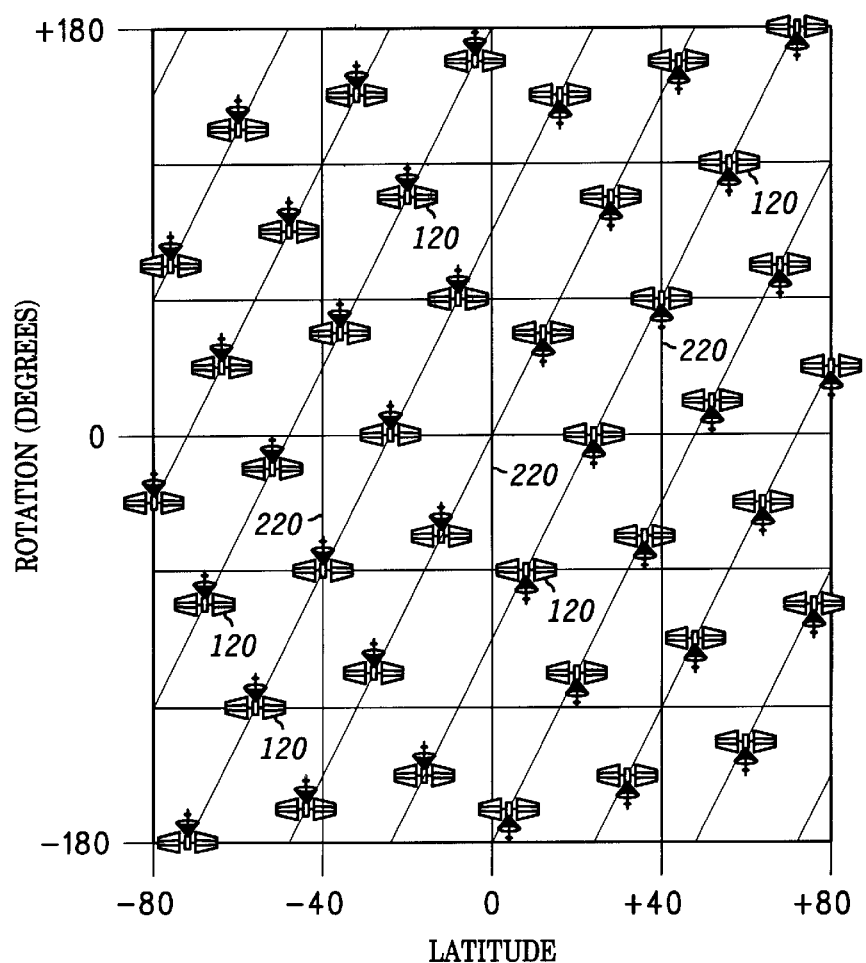
FIG. 2 illustrates a simplified view of the satellite phasing in a portion of a zero-drift constellation in accordance with a preferred embodiment of the invention.

FIG. 2 illustrates a simplified view of the satellite phasing in a portion of a zero-drift constellation in accordance with a preferred embodiment of the invention. Zero-drift constellation 200 comprises ninety satellites 120 (FIG. 1), although more or fewer satellites can be used. The ninety satellites in zero-drift constellation 200 are located in ninety orbital planes which are equally spaced around the earth at the equator. For simplicity, only every tenth orbital plane 220 is shown in FIG. 2.

In a preferred embodiment, each orbital plane contains one satellite 120. The x-axis is shown from minus eighty degrees to eighty degrees. For example, this can represent a portion of the equator. The y-axis shows 360 circular degrees. For example, 0, 180, and −180 degrees can represent the equator in a global mapping. In this case, the north pole can be at ninety degrees, and the south pole can be at minus ninety degrees.

In a preferred embodiment, each satellite is in a resonant zero-drift orbit which repeats after thirteen revolutions around the earth. This means that each satellite in the constellation traces out a substantially repeating ground track after thirteen revolutions. This also means that the phasing between satellites in the zero-drift constellation is fifty-two degrees.

In a preferred embodiment, the inclination for each orbital plane is substantially eighty-seven degrees. This inclination is relative to a north-south equatorial crossing. This inclination also eliminates the effects of the rotation of the earth. In alternate embodiments, each orbital plane can have an inclination of ninety degrees plus or minus five degrees.

In a preferred embodiment, satellites in the zero-drift constellation are located in orbits which cause the satellites to follow a common ground track. Satellites are phased in their orbits so that they are distributed at varying points along a common ground track. In this case, satellites are equally phased in their orbits. This means that satellites are phase-separated from each other by a value of 360 degrees divided by the number of satellites and multiplied by the number of revolutions.

Each satellite is phased with respect to the satellites in adjacent orbital planes. The satellite phasing angle is determined using the following equation:

Phasing Angle=360 * (n/N) degrees, where N is the number of satellites in the zero-drift constellation, and n is the number of revolutions between ground track repeats. Typically, N is a positive integer which is greater than two, and n is a positive integer which is greater than one. This phasing allows each satellite to follow the ground track of the previous satellite. In other words, all satellites trace out a substantially repeating ground track.

In a preferred embodiment, the number of revolutions is an odd-valued integer between seven and fifteen (e.g., thirteen). An odd number is used to allow the northbound satellites to trace a northbound segment of a common ground track which is substantially adjacent to a southbound segment of the common ground track which the southbound satellites trace. Northbound satellites are satellites which cross the equator heading towards the north pole. Southbound satellites are satellites which cross the equator heading towards the south pole. In addition, thirteen revolutions provide a satellite altitude (approximately 1255 kilometers) which is below the first Van Allen Belt. This also allows an orbital period which is approximately equal to 6628 seconds.

Figure 3:
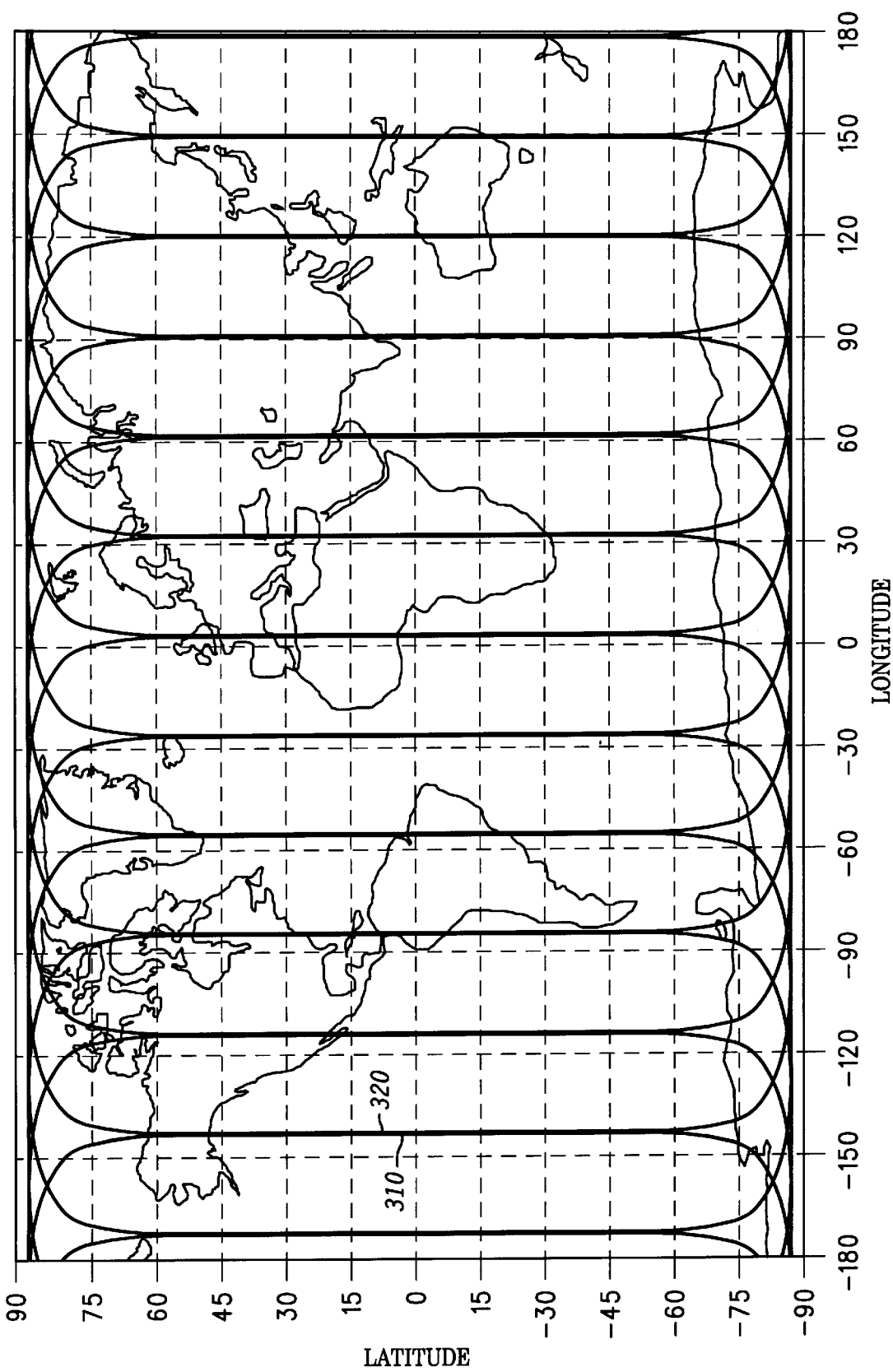
FIG. 3 illustrates a simplified view of a common ground track traced by satellites in a zero-drift constellation in accordance with a preferred embodiment of the invention.

FIG. 3 illustrates a simplified view of a common ground track traced by satellites in a zero-drift constellation in accordance with a preferred embodiment of the invention. The y-axis shows degrees of latitude with zero representing the equator, ninety indicating the north pole, and minus ninety indicating the south pole. The x-axis shows degrees of longitude with zero representing the prime meridian, and +180 degrees and −180 degrees representing a point on the earth opposite the prime meridian.

In a preferred embodiment, a portion of at least one northbound segment 310 is substantially adjacent to a portion of at least one southbound segment 320. In this case, there are thirteen pairs of adjacent segments. Northbound segments 310 are portions of the common ground track which are associated with the northbound satellites. Southbound segments 320 are portions of the common ground track which are associated with the southbound satellites.

In a preferred embodiment, an odd number is used for the number of revolutions which occur between ground track repeats. The odd number causes the northbound and southbound segments to cross the equator at approximately the same point. This allows the northbound and southbound segments to be very close (adjacent) over a wide set of latitudes. This allows a significant simplification of the ground tracking equipment. This reduces the tracking requirements to a single degree of freedom. Field of view (FOV) hand-offs can occur, eliminating the need for complex antennas. FOV hand-offs can also eliminate the need for additional antennas.

Figure 4:
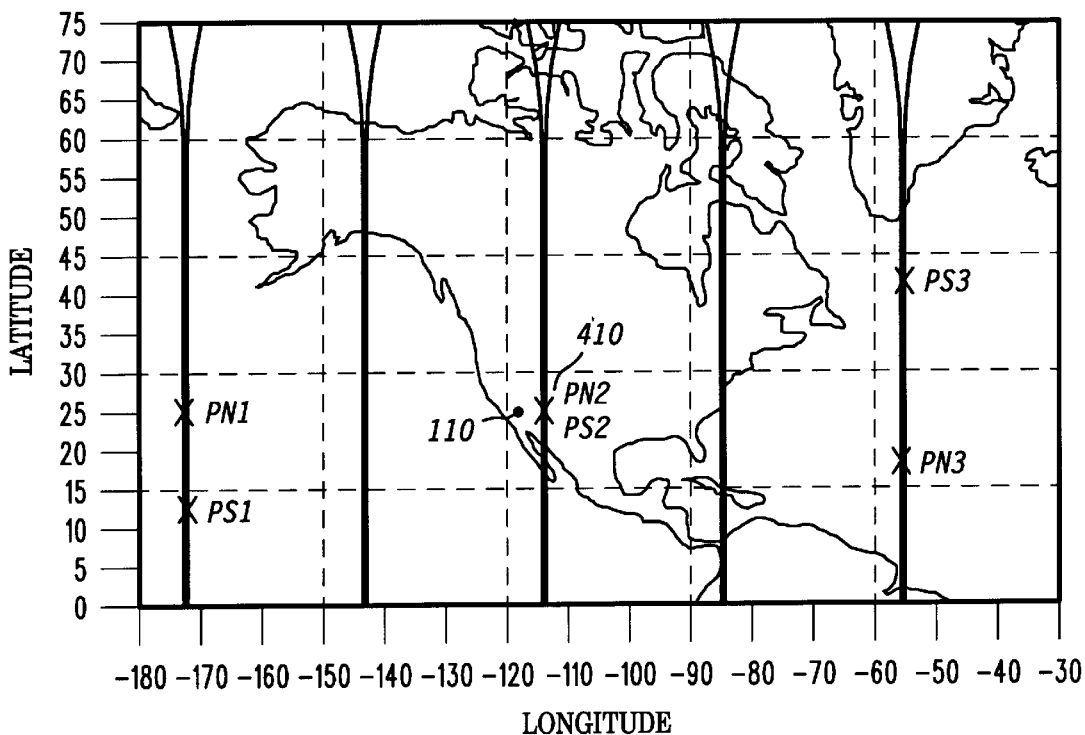
FIG. 4 illustrates an expanded view of exemplary portions of a common ground track traced by satellites in a zero-drift constellation in accordance with a preferred embodiment of the invention.

FIG. 4 illustrates an expanded view of exemplary portions of a common ground track traced by satellites in a zero-drift constellation in accordance with a preferred embodiment of the invention. The y-axis shows degrees of latitude from five degrees to sixty-five degrees. The x-axis shows degrees of longitude from minus one hundred and seventy to minus forty degrees.

A number of satellites are also shown. Some satellites illustrated are southbound satellites (PS1, PS2, and PS3). Some satellites illustrated are northbound satellites (PN1, PN2, and PN3). The first pair of satellites (PS1 and PN1) illustrate an exemplary situation which occurs after two satellites have moved past a crossover point. A second pair of satellites (PS2 and PN2) is illustrated at crossover point 410. A third pair of satellites (PS3 and PN3) illustrates an exemplary situation which occurs before two satellites have moved past a crossover point.

A crossover point can occur when a southbound satellite's ground track and a northbound satellite's ground track cross the same latitude. A crossover point can also occur when a southbound satellite's elevation angle and a northbound satellite's elevation angle are substantially equal with respect to a user terminal's field of view.

In a preferred embodiment, a user terminal hands-off a communications channel from one satellite to another satellite at a crossover point. One user terminal 110 (FIG. 1) is illustrated in FIG. 4, and crossover points 410 are used to determine tracking limits for user terminal 110. By performing a hand-off at crossover point 410, user terminal 110 tracks a satellite over a small portion of the satellite's orbit. This allows a user terminal's antenna to track between two points on the same arc (i.e., within a single degree of steering freedom, or within one angular dimension such as elevation).

In a preferred embodiment, when a user terminal has a link established with a southbound satellite, the user terminal hands-off the link to a northbound satellite at or near a first crossover point. Also, when a user terminal has a link established with a northbound satellite, the user terminal hands-off the link to a southbound satellite at or near a second crossover point.

Figure 5:
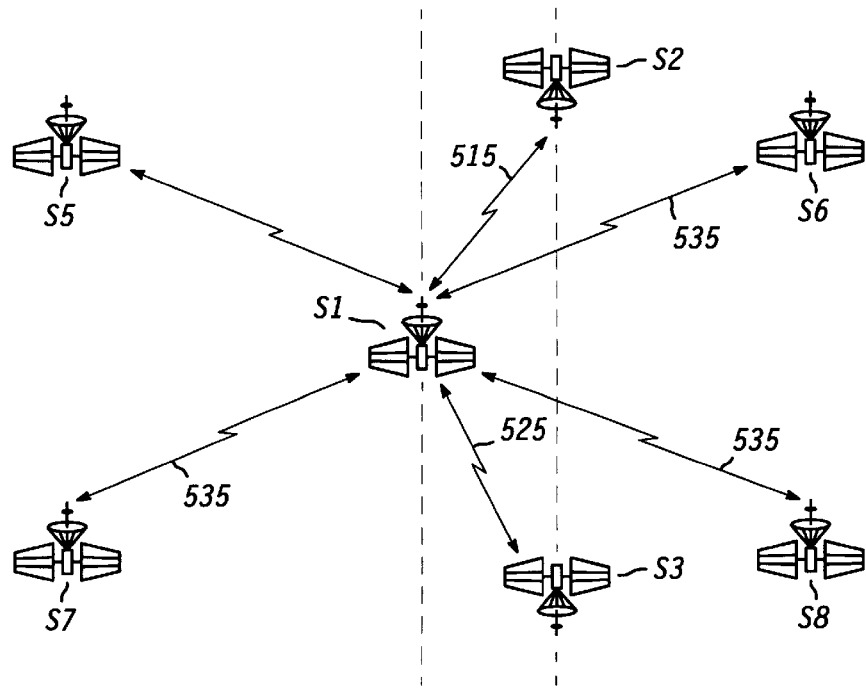
FIG. 5 illustrates a simplified view of a crosslink pattern for a number of satellites in a zero-drift constellation in accordance with a preferred embodiment of the invention.

FIG. 5 illustrates a simplified view of a crosslink pattern for a number of satellites in the zero-drift constellation in accordance with a preferred embodiment of the invention. Forward crosslink 515 is supported between satellites S1 and S2 which are approaching each other. For example, S1 is a northbound satellite; S2 is a southbound satellite; and they are moving together towards a crossover point. Doppler compensation is performed by both satellites in order to maintain this forward crosslink.

Aft (backward) crosslink 525 is supported between satellites S1 and S3 which are moving away from each other. For example, S1 is a northbound satellite; S3 is a southbound satellite; and they are moving away from each other after crossing a crossover point. Doppler compensation is performed by both satellites in order to maintain this backward crosslink.

Sideways crosslinks 535 are supported between satellites S1 and S4, satellites S1 and S5, satellites S1 and S6, and satellites SI and S7. Satellites S1, S4, S5, S6, and S7 move in the same direction around the earth. For example, satellites S1, S4, S5, S6, and S7 are all either northbound satellites or southbound satellites. Typically, Doppler compensation requirements are minimized on these crosslinks.

In a preferred embodiment, satellites in a zero-drift constellation communicate with each other over RF crosslinks. In alternate embodiments, crosslinks can be laser links or a combination of RF and laser links. A crosslink can be established between any two satellites which are located within each other's field of view and which are within communication range of each other.

In a preferred embodiment, at least one crosslink is established between a satellite located within one orbit and another satellite located within a different non-adjacent orbit. Crosslinks are established between satellites which are tracing adjacent segments of the common ground track and between satellites which are tracing non-adjacent segments of the common ground track.

Figure 6:
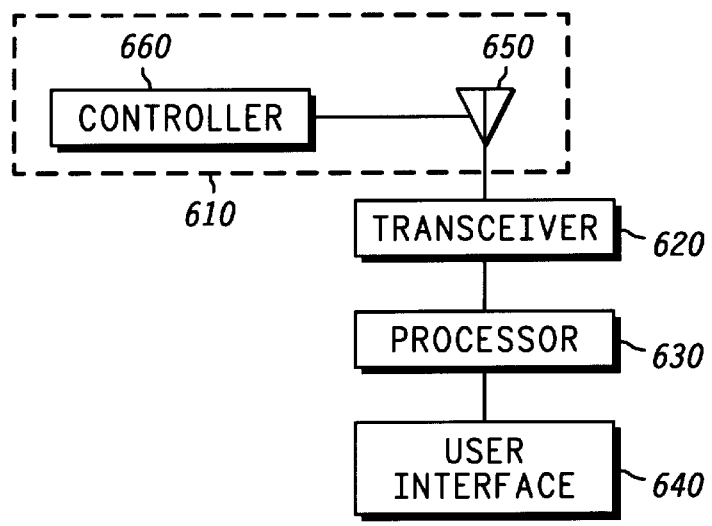
FIG. 6 shows a simplified block diagram of a user terminal in accordance with a preferred embodiment of the invention.

FIG. 6 shows a simplified block diagram of a user terminal in accordance with a preferred embodiment of the invention. User terminal 110 comprises at least one antenna subsystem 610, at least one transceiver 620 which is coupled to antenna subsystem 610, at least one processor 630 which is coupled to transceiver 620, and at least one user interface 640 which is coupled to processor 630. Antenna subsystem 610 comprises at least one controllable antenna 650 and at least one controller 660 which is coupled to controllable antenna 650.

Controllable antenna 650 is used to establish at least one link 115 (FIG. 1) with at least one satellite 120 (FIG. 1). Controllable antenna 650 (as illustrated) is coupled to transceiver 620. Controller 660 (as illustrated) is coupled to processor 630. Controller 660 implements the necessary control functions which cause controllable antenna 650 to point in the correct direction and form at least one antenna beam with the desired characteristics.

In a preferred embodiment, RF signals are received and transmitted using controllable antenna 650. RF signals are transferred between controllable antenna 650 and transceiver 620. Although the signal path is illustrated as a single line, many interconnections are possible between controllable antenna 650 and transceiver 620.

Digital data signals are transferred between controller 660 and controllable antenna 650. In the receive mode, transceiver 620 converts RF signals received from controllable antenna 650 into digital data. In the transmit mode, transceiver 620 converts digital data obtained from processor 630 into RF signals. RF signals are sent to and received from controllable antenna 650 by transceiver 620. RF signals received by transceiver 620 are converted to digital data which is sent to processor 630 to be further processed.

In a preferred embodiment, processor 630 controls the formation of links 115 (FIG. 1) by, among other things, determining link setup, determining when each satellite will be within the user terminal's FOV, and calculating at least one pointing angle for controllable antenna 650. In addition, processor 630 sends control information to controller 660 so that links can be established at the appropriate times, and it sends control information to controller 660 so that links can be handed-off at the appropriate times. Control signals are transferred between controller 660 and processor 630.

In a preferred embodiment, controllable antenna 650 includes a set of relatively simple tracking elements which are controlled by controller 660. Because satellites in a zero-drift constellation follow a constant ground track, user terminal tracking is only required to have one degree of freedom. For example, a small dish antenna could be used along with a small motor drive that moves the small dish antenna along an arc that the satellites travel along.

In alternate embodiments, controllable antenna 650 includes elements (not shown in FIG. 6) preferably arranged in a two-dimensional array. However, other array configurations are suitable. In these alternate embodiments, controllable antenna 650 can comprise a plurality of array elements which are independently controlled to produce a desired phase relationship to steer one or more antenna beams in any direction over a one-dimensional angular field of view (i.e., one degree of steering freedom). In other alternate embodiments, multi-dimensional fields of view are used.

Figure 7:
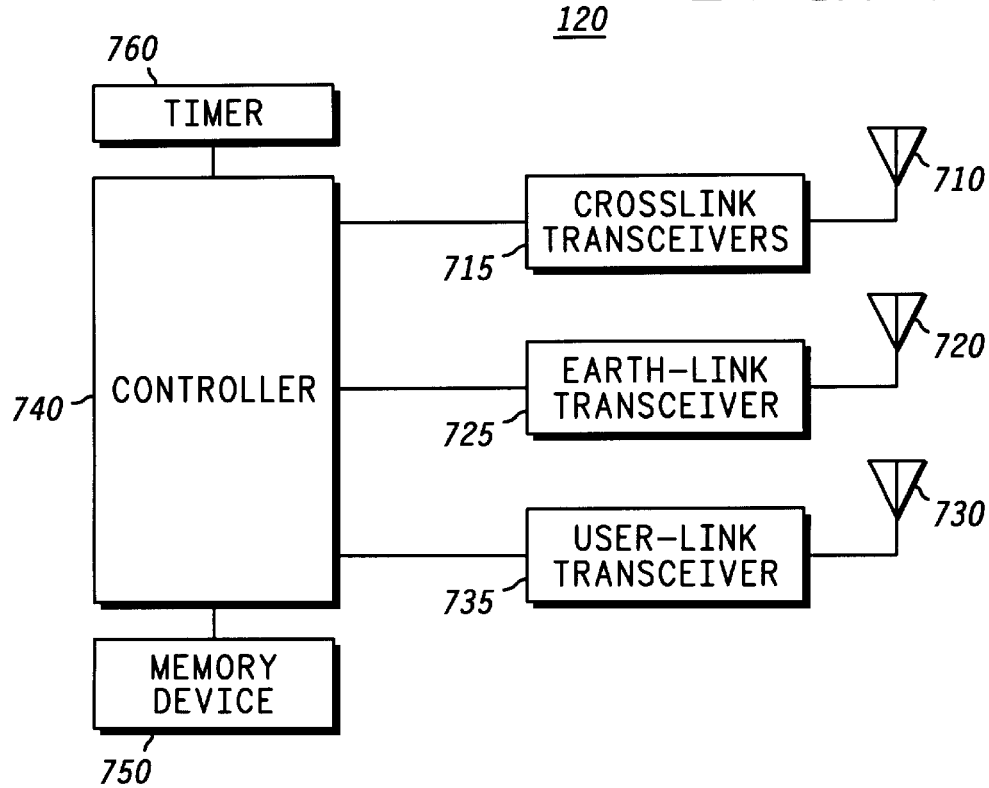
FIG. 7 illustrates a simplified block diagram of a satellite in accordance with a preferred embodiment of the invention.

FIG. 7 illustrates a simplified block diagram of a satellite in accordance with a preferred embodiment of the invention. Preferably, many or all satellites 120 (FIG. 1) within system 100 (FIG. 1) include equipment as illustrated by the simplified block diagram of FIG. 7. Satellite 120 includes crosslink transceivers 715; earth link transceivers 725; user link transceivers 735; antennas 710, 720, and 730; controller 740; memory device 750; and timer 760.

Transceivers 715 and antennas 710 support crosslinks to other in-range satellites 120 (FIG. 1). Earth link transceivers 725 and associated antennas 720 upport earth links with control centers 130 (FIG. 1). User terminal link transceivers 735 and associated antennas 730 support user terminal links with user terminals 110 (FIG. 1). Preferably, each satellite 120 can simultaneously support a number of earth links with control centers 130 and many user terminal links with user terminals 110.

In a preferred embodiment, each satellite supports forward and aft crosslinks for communicating with at least one other satellite on an adjacent segment. In addition, each satellite supports at least one other crosslink for communicating with at least one satellite in non-adjacent ground segments. In this representation, crosslinks are maintained between satellites in different segments.

Controller 740 is coupled to each of transceivers 715, 725, and 735 as well as to memory device 750 and timer 760. Controller 440 could be implemented using one or more processors. Controller 740 uses timer 760 to monitor and to maintain, among other things, knowledge of a synchronized system time. Knowledge of a synchronized system time allows satellites in a zero-drift constellation to determine when links should be established, when links should be discontinued, and when hand-offs should occur.

Memory device 750 stores data that serve as instructions to controller 740 and that, when executed by controller 740, cause satellite 120 to carry out particular aspects of the method of the invention, as will be discussed in detail below. In addition, memory device 750 desirably includes variables, tables, and databases that are manipulated during the operation of satellite 120.

In a preferred embodiment, controller 740 controls the formation of links 115, 125, and 135 (FIG. 1) by, among other things, determining link parameters, determining satellite positioning, and determining user terminal and control center positioning. Controller 740 determines, among other things, when to establish, terminate, and hand-off links 115, 125, and 135 so that data packets can be transferred between various nodes in communications system 100 (FIG. 1).

Satellite 120 can receive data packets via any one of transceivers 715, 725, and 735. After receipt of a data packet, controller 740 determines the data packet destination and determines how to route the packet. In a preferred embodiment, the routing decision depends on routing tables stored in memory device 750 and/or on the data packet type.

For clarity and ease of understanding, FIG. 7 illustrates one controller 740, one memory device 750, one timer 760, one crosslink antenna 710 and associated transceiver 715, one earth link antenna 720 and associated transceiver 725, and one user terminal link antenna 730 and associated transceiver 735. In alternate embodiments, any number of these components could be used. The number of antennas 710, 720, 730 and transceivers 715, 725, 735, for example, depends on the number of crosslinks which are to be provided and the number of terminals that satellite 120 communicates with.

Figure 8:
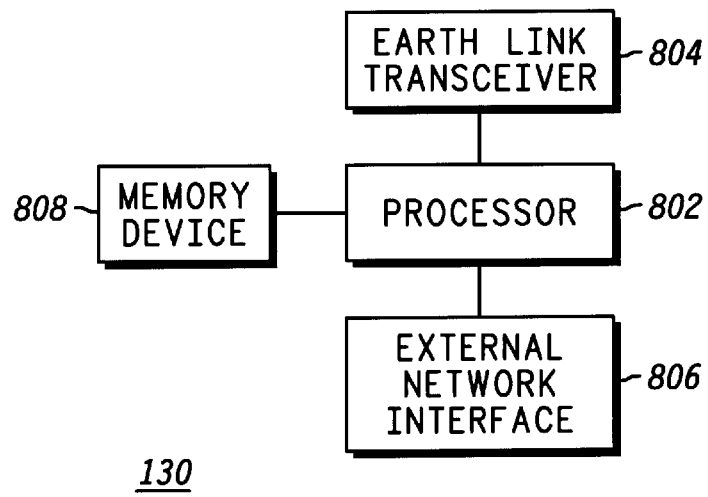
FIG. 8 illustrates a block diagram of a control center in accordance with a preferred embodiment of the invention.

FIG. 8 illustrates a block diagram of a control center in accordance with a preferred embodiment of the invention. Control center 130 (FIG. 1) is used, among other things, to control satellite operations within the zero-drift constellation. Control center can be, for example, a control facility or a switching gateway facility. A control facility can perform constellation and satellite control functions. A gateway facility enables satellites in the zero-drift constellation to exchange messages with one or more different networks (not shown).

In a preferred embodiment, control center 130 includes processor 802, earth link transceiver 804, and at least one external network interface 806. Earth link transceiver 804 is used to establish link 135 (FIG. 1). Earth link transceiver 804 is used to send and receive data to and from satellites in a zero-drift constellation. Received data could be, for example, telemetry and/or location data which enables control center to monitor the state of the satellite and/or constellation. Control center 130 also sends command and control information to satellites via earth link transceiver 804.

Control information is created by processor 802. In a preferred embodiment, processor 802 controls the formation of the earth links by determining link setup times when each satellite will be in communication range, calculating pointing angles of earth link antennas, and sending control information to satellites so that earth links can be established at appropriate times. In alternate embodiments, some or all of these calculations and control functions can be performed by multiple control centers rather than by a single control center.

In a preferred embodiment, control facility 130 also includes memory device 808, although it is not crucial to the invention. Memory device 808 is desirably used to store information associated with satellites, such as orbital and telemetry data, which are useful for controlling a zero-drift constellation.

Control centers can also include gateways. A gateway is used as a switching interface between a zero-drift constellation and another network such as, for example, a terrestrial hard-wired, terrestrial cellular, or other satellite network. External network interface 806 is used to connect the other network. Data sent and received by a gateway would typically include traffic-related data, although control data also could be exchanged. Traffic-related data could include, for example voice, data, link setup or teardown information, billing, registration, and telemetry information.

Figure 9:
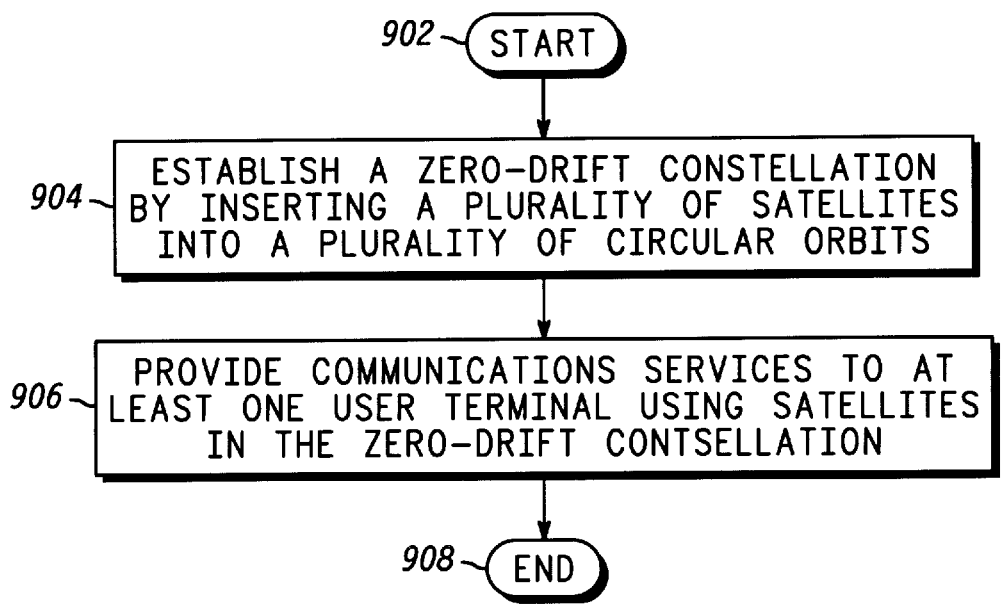
FIG. 9 illustrates a method of establishing a zero-drift constellation to provide communications services to at least one user terminal in accordance with a preferred embodiment of the invention.

FIG. 9 illustrates a method of establishing a zero-drift constellation to provide communications services to at least one user terminal in accordance with a preferred embodiment of the invention. Procedure 900 begins in step 902.

In step 904, a zero-drift constellation is established by inserting a plurality of satellites into a plurality of circular orbits based on a configuration plan. In some cases, satellites are not immediately inserted into their final orbit, but rather they are inserted into a holding orbit. In one exemplary case, at least one satellite is initially deployed into a holding orbit which is lower than the intended zero-drift orbit. The characteristics of the holding orbit depend on the type of launch vehicle used.

The position of each satellite in a holding orbit is evaluated with respect to its intended zero-drift orbit. The evaluation can be based, for example, on telemetry information received from a satellite or satellites and/or gateways which determines the current orbital parameters for each of the satellites in holding orbits.

In some cases, an insertion profile is determined for each satellite in a holding orbit. The insertion profile includes, among other things, a thruster schedule. A thruster schedule is used to determine which thrusters are to be used and when they are to be used. In other cases, an insertion profile is part of a configuration plan.

In a preferred embodiment, multiple satellites are launched into a single holding orbit. Then, each satellite is inserted into a different zero-drift orbital plane by initiating an insertion profile at different times. The differences between initiation times cause satellites to be positioned in different zero-drift orbits.

Each satellite uses its own insertion profile to position itself in the proper zero-drift orbit. After insertion into the proper position within a zero-drift constellation, the satellites begin to establish crosslinks with other satellites already in place. Constellation capacity is increased as additional satellites are installed in their required orbital positions.

In step 906, a zero-drift constellation is used to provide communications services to at least one user terminal. Links are established between satellites in the zero-drift constellation and user terminals. Links are handed-off from one satellite to another as satellites pass through a user terminal's field of view.

In a preferred embodiment, satellites in a zero-drift constellation utilize crosslinks to route data between each other. At least one control center is used to control the zero-drift constellation. Communications services can be provided when a zero-drift constellation is at least partially deployed. The control center, among other things, determines which satellites, which links, and which crosslinks in the zero-drift constellation are available at particular times and at particular locations.

Satellites are used to route data packets within a zero-drift constellation. When a satellite receives a data packet, the satellite evaluates routing information associated with the data packet. In some cases, a data packet is routed to a destination satellite that is located on an adjacent segment. In other cases, a data packet is routed to a destination satellite that is not located on an adjacent segment.

Crosslinks can be established based on the location of the destination satellite relative to the sending satellite. In one case, a forward crosslink is established. This occurs when satellites on adjacent (side-by-side) segments are approaching each other. In a second case, a backward crosslink is established. This occurs when satellites on adjacent segments are moving away from each other.

In some cases, a data packet is sent to a destination satellite which is not located in an adjacent segment. In these cases, a further determination is made with respect to the location of the destination satellite relative to the sending satellite. In one case, a forward right or a forward left crosslink is established. This occurs when a destination satellite is in front of the current satellite. In the second case, a backward right or a backward left crosslink is established. This occurs when a destination satellite is in back of the current satellite.

In these cases, a data packet is sent to a destination satellite over a crosslink between the current (receiving) satellite and a destination satellite. In other cases, a data packet is sent over an appropriate downlink to a ground-based destination device, such as a user terminal or a control center. Procedure 900 ends in step 908.

Figure 10:
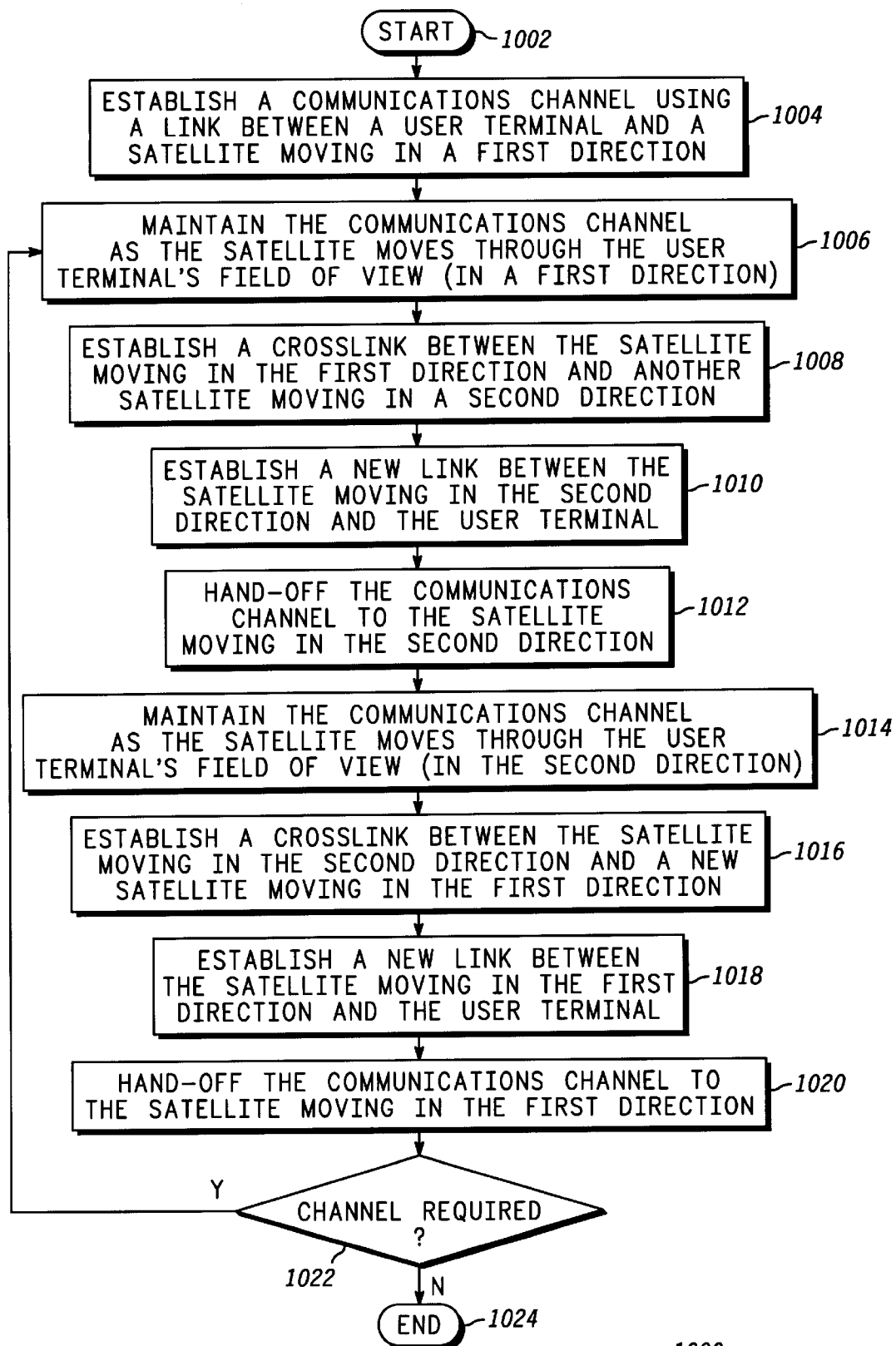
FIG. 10 illustrates a method of operating a zero-drift constellation to provide communications services to a user terminal in accordance with a preferred embodiment of the invention.

FIG. 10 illustrates a method of operating a zero-drift constellation to provide communications services to a user terminal in accordance with a preferred embodiment of the invention. Procedure 1000 starts with step 1002.

In step 1004, a communications channel is created by establishing a link between a user terminal and a satellite in a zero-drift constellation as the satellite moves in a first direction relative to the user terminal.

In step 1006, the communications channel is maintained as the satellite moves through the user terminal's field of view. The satellite and the user terminal cooperate to maintain this link. In a preferred embodiment, a user terminal's field of view is determined by the tracking range of the antenna associated with the user terminal.

In step 1008, a crosslink is established between the satellite moving in the first direction and a satellite traveling in a second direction (relative to the user terminal). The two satellites cooperate with each other to establish and maintain the crosslink. In a preferred embodiment, crosslinks are established before a crossover point is reached. Crosslinks are used before, during and after a hand-off has occurred.

In step 1010, a new link is established between the user terminal and the satellite moving is the second direction. Desirably, this occurs when the satellite moving in the second direction moves into the user terminal's field of view. The user terminal and the satellite moving in the second direction cooperate in establishing and maintaining this link.

In step 1012, the communications channel is handed-off from the satellite moving in the first direction to the satellite moving in the second direction. Typically, this occurs at or near a first crossover point. The user terminal has a limited field of view, and the satellite moving in the first direction begins to move out of this limited field of view.

In step 1014, the communications channel is maintained as the satellite moving in the second direction moves in this second direction through the user terminal's field of view.

In step 1016, a new crosslink is established between the satellite moving in the second direction and a new (third) satellite moving in the first direction. As each satellite moves in its orbit, it follows a constant ground path. In a preferred embodiment, each satellite moves through a user terminal's field of view in a first direction for a first amount of time at a first time of day and moves through this user terminal's field of view in a second direction for a second amount of time at a second time of day. The new satellite moving in the first direction and the satellite moving in the second direction cooperate in establishing and maintaining this new crosslink.

In step 1018, a new link is established between the user terminal and the satellite moving in the first direction. Desirably, this occurs when the satellite moving in the first direction moves into the user terminal's field of view. The user terminal and the satellite moving in the first direction cooperate in establishing and maintaining this link.

Multiple links can be supported by a user terminal using different frequencies, different codes and/or modulation formats. In a preferred embodiment, multiple links between a user terminal and a number of satellites are accomplished using different operating frequencies.

In step 1020, the communications channel is handed-off from the satellite moving in the second direction to the satellite moving in the first direction. Typically, this occurs at or near a second crossover point. The user terminal has a limited field of view, and the satellite moving in the second direction begins to move out of this limited field of view. The satellite moving in the first direction begins to move through this limited field of view.

In step 1022, a query is performed to determine if the communications channel should be continued. When the communications channel is still required, procedure 1000 branches back to step 1006, and procedure 1000 iterates as shown in FIG. 10. When a communications channel is no longer required, procedure 1000 ends in step 1024.

Figure 11:
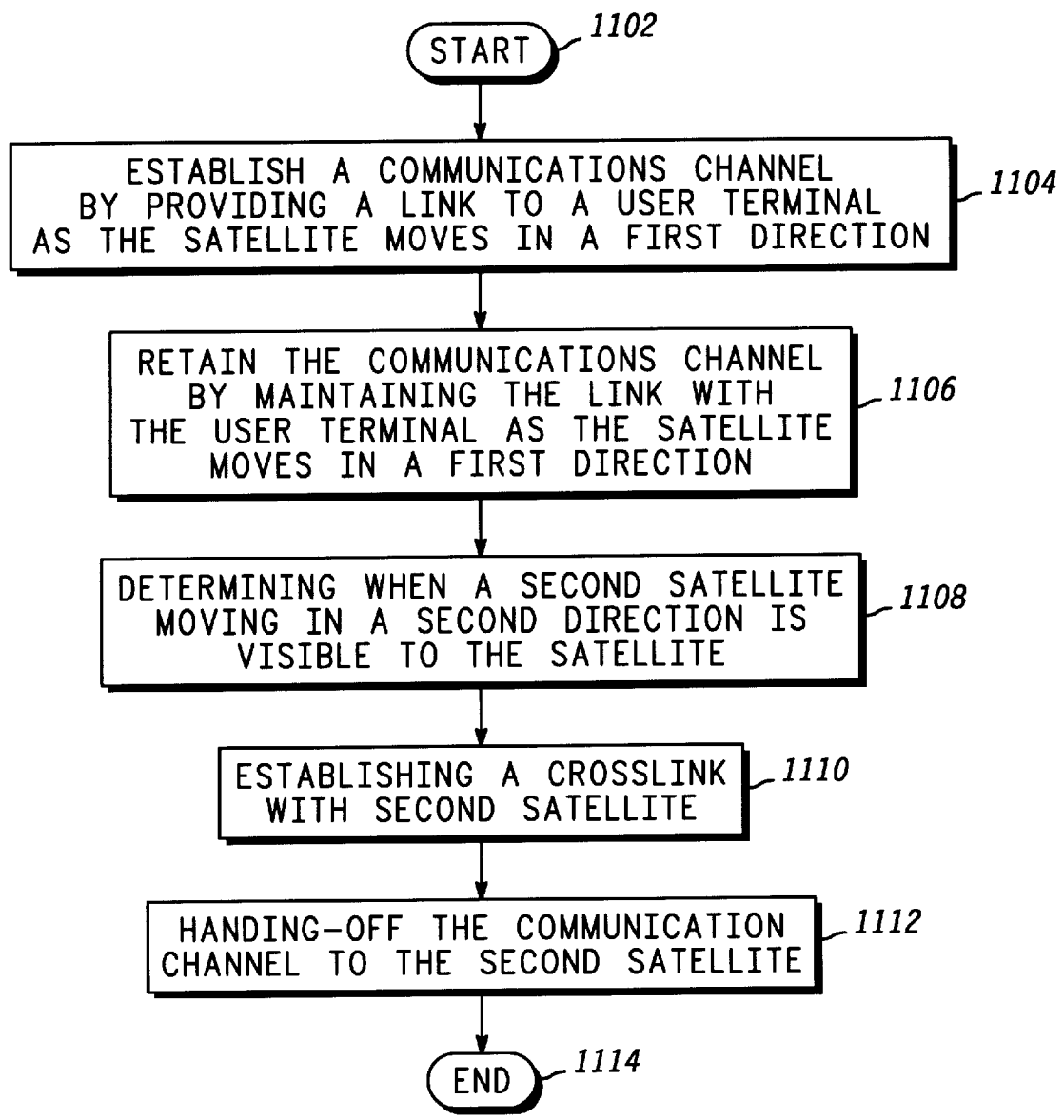
FIG. 11 illustrates a method of operating a satellite to establish a communications channel between a satellite in a zero-drift constellation and a user terminal in accordance with a preferred embodiment of the invention.

FIG. 11 illustrates a method of operating a satellite to establish a communications channel between a satellite in a zero-drift constellation and a user terminal in accordance with a preferred embodiment of the invention. Procedure 1100 starts in step 1102 which could be the result of a satellite being within a user terminal's field of view when a communications channel is initiated.

In step 1104, a communications channel is established (initiated) when the satellite provides a link to a user terminal. In this case, the satellite is moving in a first direction relative to the user terminal. Desirably, a satellite transmits data packets to a user terminal and receives data packets from a user terminal.

In step 1106, the satellite retains the communications channel by maintaining a link with the user terminal as the satellite moves with respect to the user terminal. Desirably, the communications channel is retained as long as information is being sent to or received from the user terminal.

In step 1108, the satellite determines when a second satellite moving in a second direction relative to the user terminal is visible to the satellite. A satellite can store information concerning the position of other satellites, or the satellite can be sent this information.

In step 1110, the satellite establishes a crosslink with the second satellite. Crosslinks can be established as required or according to a schedule.

In step 1112, the satellite performs a hand-off with the second satellite. This particular satellite is moving out of the user terminal's field of view, and the second satellite is moving into and through the user terminal's field of view. The second satellite is now the better satellite to use to maintain the communications channel.

Procedure 1100 ends in step 1114. Typically, the first satellite real-locates the resources that were being used to establish the link. In some cases, the resources are used to establish a different link with another user terminal as the first satellite proceeds along the common ground path.

Figure 12:
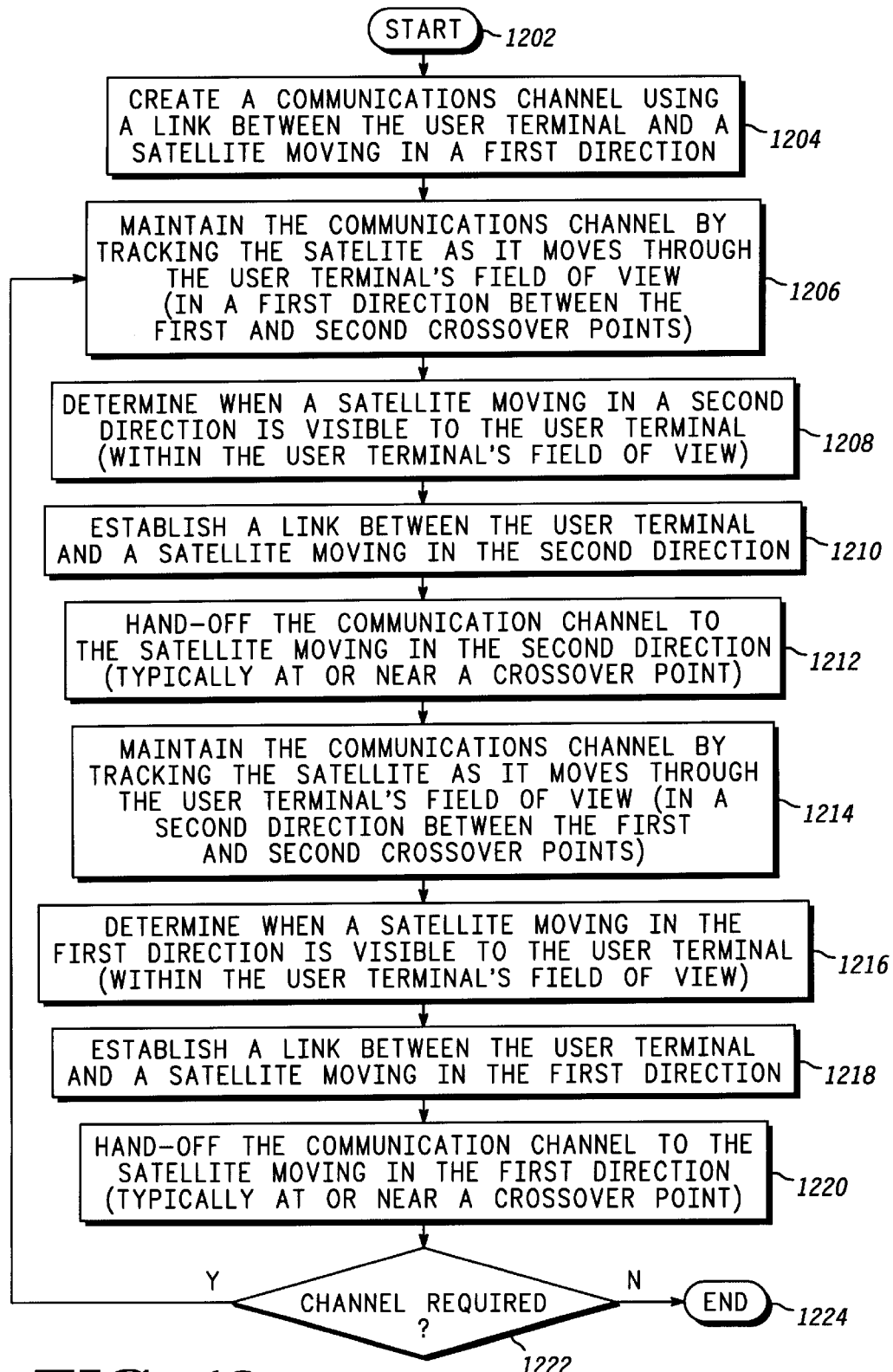
FIG. 12 illustrates a method of operating a user terminal to establish a communications channel between a user terminal and at least one satellite in a zero-drift constellation in accordance with a preferred embodiment of the invention.

FIG. 12 illustrates a method of operating a user terminal to establish a communications channel between a user terminal and at least one satellite in a zero-drift constellation in accordance with a preferred embodiment of the invention. Procedure 1200, which starts in step 1202, is applicable to the operation of any type of ground-based equipment (e.g., a user terminal, gateway, or control facility).

In step 1204, a communications channel is created by establishing a link between the user terminal and a satellite in a zero-drift constellation where the satellite is moving in a first direction relative to the user terminal.

In step 1206, the communications channel is maintained as the satellite moves in the first direction. In this case, the user terminal tracks the satellite as it moves in the first direction relative to the user terminal. The user terminal tracks the satellite (in order to maintain the communications channel) by continuously orienting an antenna toward the satellite as the satellite moves in its orbit. Tracking is accomplished using a relatively simple, single-dimensional antenna control device. A simple tracking device is used, among other things, to minimize the cost of the user terminal.

In step 1208, the user terminal determines when a new satellite is visible. This can be accomplished, for example, by monitoring broadcast channels. In a preferred embodiment, the new satellite is moving in an opposite direction with respect to the satellite which the user terminal is currently tracking. A user terminal can store information about the visibility of satellites in a zero-drift constellation at particular times, or this information can be sent to a user terminal using the communications channel currently being supported for the user terminal.

In step 1210, the user terminal establishes and evaluates a link with a new satellite. In a preferred embodiment, establishing two links does not require a user terminal to have two antennas.

In step 1212, the user terminal hands-off the communications channel to the new satellite. In a preferred embodiment, a hand-off is performed at or near one of the crossover points.

In a preferred embodiment, a user terminal and at least one satellite cooperate in determining a hand-off time. In other embodiments, a user terminal could determine that a time to hand-off has arrived by its own calculations or from a message received from some other device (e.g., a gateway or control facility).

Procedure 1200 uses a make-before-break hand-off sequence, whereby a second link is established prior to breaking the first link. In alternate embodiments, a user terminal could use a break-before-make hand-off sequence or a simultaneous make-break hand-off sequence.

In step 1214, the communications channel is maintained using the link with the satellite moving in the second direction. In this case, the user terminal tracks the satellite as it moves in the second direction. In a preferred embodiment, the second direction is opposite to the first direction. The user terminal tracks the satellite (in order to maintain the link) by reorienting an antenna toward the satellite as the satellite moves in its orbit. Tracking is accomplished using a simple, single-dimensional antenna control device.

In step 1216, the user terminal determines when a new (third) satellite is visible. In a preferred embodiment, the new satellite is moving in the first direction with respect to the user terminal. Typically, this is in a direction which is opposite to the direction in which the user terminal's antenna is currently tracking.

In step 1218, the user terminal establishes and evaluates a link with the new satellite which is moving in the first direction.

In step 1220, the user terminal hands-off the communications channel to the new satellite. In a preferred embodiment, a hand-off is performed at or near one of the crossover points. Desirably, a user terminal and at least one satellite cooperate in determining a hand-off time.

In step 1222, a query is performed to determine if the communications channel should be maintained. If the communications channel should be maintained, then procedure 1200 branches to step 1206, and procedure 1200 iterates as shown in FIG. 12. If the communications channel should not be maintained, then procedure 1200 ends in step 1224.

When a hand-off occurs, the communications channel is maintained using the link with the (third) satellite moving in the first direction. In this case, the user terminal relinquishes the link with the satellite moving in the second direction.

In summary, a method and apparatus have been described which use multiple satellites which trace out a substantially common ground track, which communicate with user terminals, and which communicate with each other over crosslinks. Various embodiments of the invention have numerous advantages over the prior art. In addition, a method and apparatus have been described for an improved user terminal in which the complexity and associated costs have been reduced.

The invention has been described above with reference to a preferred embodiment. However, those skilled in the art will recognize that changes and modifications can be made in this preferred embodiment without departing from the scope of the invention. For example, the procedures and steps identified herein can be categorized and organized differently than described herein while achieving equivalent results.

In addition, communications payloads on board the satellites in a zero-drift constellation can be extended to include imaging information, navigational information, surveillance information, and any other information derived from the earth-space geometry of the zero-drift constellation and the transfer of such information. These and other changes and modifications which are obvious to those skilled in the art are intended to be included within the scope of the invention.

What is claimed is:

1. A satellite communications system for providing communications services, said satellite communications system comprising:

N satellites configured in a zero-drift constellation for providing said communications services, where N is a integer greater than two, said N satellites being located in N orbital planes which are equally spaced around the earth at the equator, wherein said N satellites orbit the earth in separate circular orbits, said N satellites are interconnected using crosslinks, and all of said N satellites trace a common ground track which repeats after n revolutions, where n is an odd integer which is in a range from seven to fifteen, and each satellite is phased with respect to satellites in adjacent orbital planes so that said N satellites are distributed at varying points along said common ground track, said common ground track comprising n northbound segments and n southbound segments, a portion of each northbound segment being substantially adjacent to a portion of a southbound segment; and a plurality of user terminals for obtaining said communications services from said N satellites in said zero-drift constellation, wherein a user terminal includes means for establishing a first link with a first satellite traveling in a first direction along said common ground track, means for using said first link to establish a communications channel for obtaining said communications services until a first crossover point is reached, means for establishing, at said first crossover point, a second link with a second satellite traveling along a southbound segment of said common ground track, means for handing-off said communications channel from said first link to said second link, and means for using said second link for obtaining said communications services until a second crossover point is reached.

2. The satellite communications system as claimed in claim 1, wherein said N satellites have inclinations between 85 and 95 degrees.

3. The satellite communications system as claimed in claim 1, wherein said N satellites have Right Ascension of the Ascending Node (RAAN) offsets defined by (360–360/N) degrees.

4. The satellite communications system as claimed in claim 1, wherein satellites in adjacent orbital planes are separated from each other by a phasing angle substantially equal to 360*n/N degrees.

5. The satellite communications system as claimed in claim 1, wherein northbound segments are associated with northbound satellites, said northbound satellites moving across the equator at a first point from a southern hemisphere to a northern hemisphere; and southbound segments are associated with southbound satellites, said southbound satellites moving across the equator at a second point from said northern hemisphere to said southern hemisphere, said first point and said second point occurring at substantially equal points of longitude.

6. The satellite communications system as claimed in claim 5, wherein said crosslinks are established between a northbound satellite and a southbound satellite that are tracing adjacent segments of the common ground track and between satellites which are tracing non-adjacent segments of the common ground track.

7. The satellite communications system as claimed in claim 1, wherein said first crossover point and said second crossover point occur when a southbound satellite's ground track and a northbound satellite's ground track cross the same latitude.

8. The satellite communications system as claimed in claim 1, wherein said first crossover point and said second crossover point occur when a southbound satellite's elevation angle and a northbound satellite's elevation angle are substantially equal with respect to a user terminal's field of view.

9. The satellite communications system as claimed in claim 1, wherein said user terminal has a limited tracking range which is defined by a single degree of steering freedom.

10. The satellite communications system as claimed in claim 1, wherein said user terminal includes means for establishing, at said second crossover point another link with another satellite traveling in said first direction along said common ground track, means for handing-off said communications channel from said second link to said another link, and means for using said another link to obtain said communications services until said first crossover point is reached.

11. The satellite communications system as claimed in claim 10, wherein said N satellites include means for establishing a communication link with a control center.

12. A user terminal for obtaining communications services from N satellites in a zero-drift constellation, said N satellites being located in N orbital planes which are equally spaced around the earth at the equator, where N is an integer greater than two, wherein said N satellites are interconnected using crosslinks, all of said N satellites trace a common ground track which repeats after n revolutions, where n is an odd integer which is in a range from seven to fifteen, and each satellite is phased with respect to satellites in adjacent orbital planes so that said N satellites are distributed at varying points along said common ground track, said common ground track comprising n northbound segments and n southbound segments, a portion of each northbound segment being substantially adjacent to a portion of a southbound segment, wherein said user terminal comprises:

an antenna subsystem comprising at least one controllable antenna and controller coupled to said at least one controllable antenna;

transceiver coupled to said antenna subsystem; and processor coupled to said transceiver, said user terminal including means for establishing a communications channel with a first satellite in said zero-drift constellation as said first satellite travels along a northbound segment of said common ground track, said antenna subsystem comprising tracking means for tracking said first satellite until a first crossover point is reached, said user terminal further including means for handing-off said communications channel to a second satellite in said zero-drift constellation as said second satellite travels along an adjacent southbound segment of said common ground track, said tracking means comprising means for tracking said second satellite until a second crossover point is reached, wherein said at least one controllable antenna has a limited tracking range, said limited tracking range being defined by said two crossover points determined by satellite positions in said zero-drift constellation, and said controller comprising means for controlling a pointing direction within said limited tracking range.

13. The user terminal as claimed in claim 12, wherein said user terminal further comprises a user interface.

14. The user terminal as claimed in claim 12, wherein said tracking means moves said at least one controllable antenna in one dimension over a restricted range of elevation angles, said restricted range being determined by said crossover points.

15. The user terminal as claimed in claim 12, wherein said tracking means moves said at least one controllable antenna within a limited angular range, wherein said limited angular range is determined by two limits which are defined by elevation angles.

16. The user terminal as claimed in claim 12, wherein said tracking means includes means for tracking said first satellite from a first elevation angle to a second elevation angle and means for tracking said second satellite from said second elevation angle to a third elevation angle, wherein said first elevation angle and said third elevation angle are substantially equal.

17. A method of operating a satellite communications system for providing communications services, said method comprising the steps of:

a) establishing a zero-drift constellation having N crosslinked satellites, where N is a integer greater than two, the satellites being located in N orbital planes, orbiting the earth in circular orbits, and producing a common ground track which repeats after n revolutions, where n is odd integer in a range from seven to fifteen, said common ground track comprising n northbound segments and n southbound segments, a portion of each northbound segment being substantially adjacent to a portion of a southbound segment;

b) establishing a communications channel to provide said communications services using a link between a user terminal and a first satellite moving along a northbound segment, said user terminal having an antenna which tracks said satellites over a restricted range of elevation angles;

c) maintaining said communications channel as said first satellite moves in a first direction through a field of view of said user terminal;

d) establishing a crosslink between said first satellite and a second satellite moving in a second direction alone a southbound segment;

e) establishing a new link between said second satellite and said user terminal;

f) handing-off said communications channel to said second satellite at a first crossover point;

g) maintaining said communications channel as said second satellite moves in a second direction through said field of view of said user terminal;

h) establishing a new crosslink between said second satellite and a third satellite moving along said northbound segment;

i) establishing another new link between said third satellite and said user terminal;

j) handing-off said communications channel to said third satellite at a second crossover point; and k) repeating steps c) through i) as long as communications services are being provided to said user terminal.

18. The method as claimed in claim 17, wherein step a) further comprises the step of:

inserting one of said N crosslinked satellites into each of said N orbital planes, said N orbital planes having inclinations between 85 and 95 degrees and wherein said N orbital planes have equatorial offsets defined by (360–360/N) degrees, wherein satellites in adjacent orbital planes being phased using a phasing angle substantially equal to 360*n/N degrees.

19. A method of operating a satellite in a zero-drift constellation to establish a communications channel with a user terminal, said zero-drift constellation having N crosslinked satellites, where N is a integer greater than two, the satellites being located in N orbital planes, orbiting the earth in circular orbits, and producing a common ground track which repeats after n revolutions, where n is odd integer in a range from seven to fifteen, said common ground track comprising n northbound segments and n southbound segments, a portion of each northbound segment being substantially adjacent to a portion of a southbound segment, said method comprising the steps of:

a) establishing said communications channel by providing a link with said user terminal when said satellite is moving in a first direction along a northbound segment;
   b) retaining said communications channel by maintaining said link with said user terminal as said satellite moves in said first direction along said northbound segment;
   c) determining when a second satellite moving in a second direction along an adjacent southbound segment is visible to said satellite;
   d) establishing a crosslink with said second satellite moving in said second direction along said adjacent southbound segment; and
   e) handing-off said communications channel to said second satellite at a crossover point.

20. A method of operating a user terminal to establish a communications channel using at least one satellite in a zero-drift constellation, said zero-drift constellation having N crosslinked satellites, where N is a integer greater than two, the satellites being located in N orbital planes, orbiting the earth in circular orbits, and producing a common ground track which repeats after n revolutions where n is odd integer in a range from seven to fifteen, said common ground track comprising n northbound segments and n southbound segments, a portion of each northbound segment being substantially adjacent to a portion of a southbound segment, said method comprising the steps of:

a) creating said communications channel by establishing a first link with a first satellite moving along a northbound segment;
   b) retaining said communications channel by maintaining said first link, wherein said user terminal tracks said first satellite as it moves along said northbound segment in a first direction relative to said user terminal;
   c) determining when a second satellite moving along an adjacent southbound segment is visible to said user terminal;
   d) establishing a second link with said second satellite;
   e) handing-off said communications channel to said second satellite at a first crossover point;
   f) retaining said communications channel by maintaining said second link, wherein said user terminal tracks said second satellite as it moves along said southbound segment in a second direction relative to said user terminal;
   g) determining when a third satellite moving along said northbound segment is visible to said user terminal;
   h) establishing a new first link with said third satellite;
   i) handing-off said communications channel to said third satellite; and
   j) repeating steps b) through i) as long as said communications channel is required.

* * * * *